Oct. 8, 1929.          C. B. SPASE          1,731,064
INDUSTRIAL CLUTCH CONSTRUCTION
Filed Sept. 2, 1927
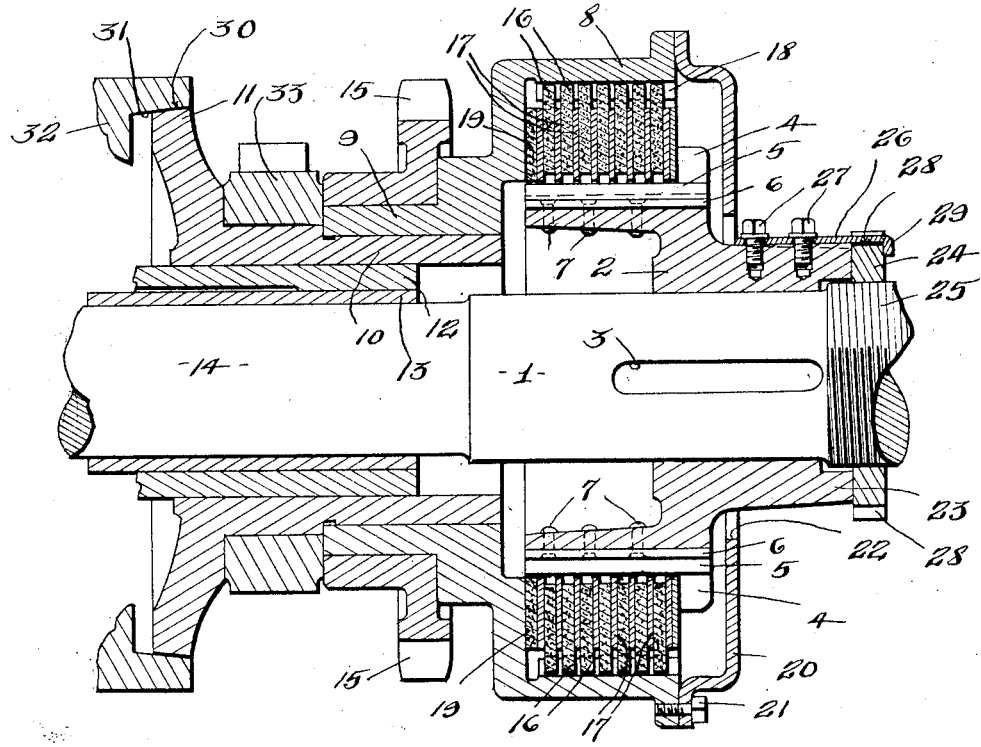
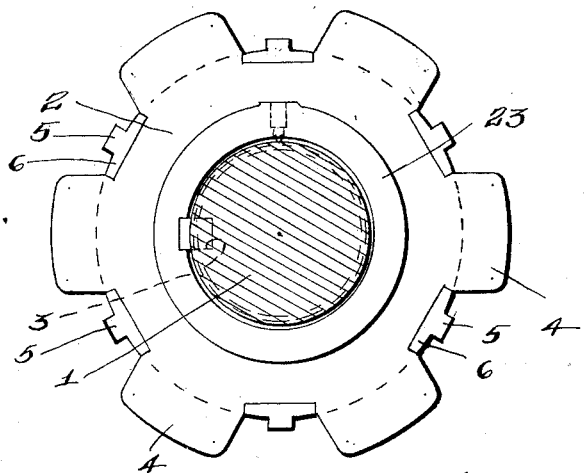
INVENTOR.
Charles B. Spase
BY
Parsons & Bodell
ATTORNEYS.

Patented Oct. 8, 1929

1,731,064

UNITED STATES PATENT OFFICE

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK

INDUSTRIAL-CLUTCH CONSTRUCTION

Application filed September 2, 1927. Serial No. 217,141.

This invention relates to clutches and has for its object, a clutch which is particularly applicable for industrial purposes as distinguished from automotive purposes, which clutch is particularly simple in construction, is composed of a minimum of compactly arranged parts and is highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of this clutch.

Figure 2 is a detail end view of the inner clutch drum.

This clutch is particularly adapted to transmit the motion of a drive shaft to some driven part, and comprises an inner clutch drum mounted on and rotatable with the shaft and held from axial movement, an outer clutch drum rotatable about the shaft and housing the inner drum and being also shiftable axially, friction members as interleaved disks interlocked respectively with the drums and engageable and disengageable by the axial shifting of the outer drum, the outer drum having a motion transmitting member associated therewith and means for shifting the outer drum.

The outer drum has a hub which is mounted on a sleeve having a brake head associated therewith and the sleeve is rotatably mounted on the shaft, there being bearing sleeves interposed between the sleeve of the brake and the shaft.

1 designates the shaft and 2 the inner drum mounted on the shaft, it being keyed or otherwise secured thereto, a keyway 3 in the shaft being shown for receiving the key which secures the inner drum 2 to the shaft 1. The inner drum is provided with radially extending spaced apart flanges or abutments 4 at one end and with lengthwise keys 5 between the abutments, these keys having bases 6 fitted into lengthwise grooves or channels in the drum 2 and secured therein in any suitable manner as by rivets 7 extending through the bases on opposite sides of the ribs or keys 5.

8 designates the outer drum arranged to enclose or house the inner drum, the drum 8 having a hub 9 mounted on and secured to a sleeve 10 which has a brake head 11 at its outer end. Suitable bearing sleeves 12 and 13 are interposed between the sleeve 10 and the reduced portion 14 of the shaft 1.

15 is a motion transmitting member as a sprocket wheel fitted on a reduced portion of the hub 9.

16 and 17 are respectively, sets of interleaved disks interlocked with the outer drum 8 and the inner drum 2, the outer drum 8 being formed with internal keys 18 for interlocking with the disks 16 and the disks 17 interlocked with the keys 5 of the inner drum 2. The disks 16 are preferably of a fibrous material instead of being steel disks with facings, and the inner disks 17 are steel disks.

19 is an idle fiber disk abutting against the head of the outer drum 8 and the adjacent steel disk 17, this idle disk being for the purpose of preventing the steel disk from coming in contact with the metal head of the drum 8. The drum 8 is also provided with an end plate 20 detachably secured thereto as by screws 21, this plate having an opening 22 through which the hub 23 of the drum 2 extends. The drum 2 is adjustable axially to take up the wear of the friction disks and maintain the relative position of the brake head 11 to its coacting surface and also maintain the throw of the operating means for the shiftable clutch drum 8. The means for adjusting the inner drum as here illustrated, comprises a nut 24 turning on an enlarged threaded portion 25 of the shaft 1 against the end of the hub 23 and this nut is held in its adjusted position by a retaining member 26 secured to the hub 23 as by screws 27, the retaining member entering any one of a number of notches 28 in the nut and having a shoulder 29 at its outer end which engages the outer face of the nut and holds the drum 2 from any tendency to move inwardly when the clutch is being disengaged. The nut 24 takes the end thrusts of the drum 2 when the friction disks are engaged. The shoulder 29 merely holds the inner drum 2 from following the drum 8 when the friction members are disengaged.

The brake head 11 is formed with a conical friction surface 30 and coacts with a complemental surface 31 on any suitable fixed part 32.

The clutch drum 8 is shifted axially by suitable shifting means as a ring 33 surrounding the sleeve 10 and is located in a channel formed by the brake head 11 and the end of the hub 9 of the outer drum 8 and the end of the hub of the power transmitting member 15. This ring may be shifted by any suitable means and is held in its position occupied when the clutch is engaged by any suitable mechanism forming part of the operating means and not forming part of this invention.

In operation, when the operating means is shifted to the right, the clutch drum 8 and brake head 11 are also shifted to the right to engage the clutch disks 16, 17 so that the rotary motion of the shaft 1 will be transferred to the sprocket member 15 which also shifts with the hub 9 of the drum 8.

The shifting of the drum 8 to the right also disengages the brake head 11. By releasing the handle or other means connected to the ring 33, the clutch will disengage. To adjust the inner drum 8 to take up the wear of the friction disks, the screws 27 are loosened sufficiently to disengage the retaining member 26 from the nut 24 and the nut 24 tightened, the retaining member again located and the screws 27 tightened.

This clutch construction is particularly advantageous in that it with its brake mechanism is compactly arranged and the outer drum forms a complete housing for the clutch mechanism.

What I claim is:

The combination of a shaft, an inner clutch drum having a hub mounted on the shaft and rotatable therewith, an axially shiftable outer drum enclosing the inner drum, and interleaved disks between the drums, a brake member having a hub surrounding the shaft and having a bearing thereon, the outer drum having a hub mounted on the hub of the brake member, a motion transmitting wheel mounted on the hub of the outer drum, all whereby the brake member, wheel and outer drum are a unit, and a shifting fork interposed between the end of the hub of the outer drum and the brake member.

CHARLES B. SPASE.